United States Patent
Noh et al.

(10) Patent No.: US 8,906,552 B2
(45) Date of Patent: Dec. 9, 2014

(54) LITHIUM IRON PHOSPHATE OF OLIVINE CRYSTAL STRUCTURE AND LITHIUM SECONDARY BATTERY USING THE SAME

(71) Applicant: LG Chem, Ltd., Seoul (KR)

(72) Inventors: Hyun Kuk Noh, Daejeon (KR); Hong Kyu Park, Daejeon (KR); Su-min Park, Daejeon (KR); Ji Eun Lee, Daejeon (KR); Cheol-Hee Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/631,130

(22) Filed: Sep. 28, 2012

(65) Prior Publication Data

US 2013/0029226 A1    Jan. 31, 2013

Related U.S. Application Data

(63) Continuation of application No. PCT/KR2011/002878, filed on Apr. 21, 2011.

(30) Foreign Application Priority Data

Apr. 21, 2010 (KR) .................. 10-2010-0037080

(51) Int. Cl.
*H01M 4/02* (2006.01)
*H01M 4/36* (2006.01)
*H01M 4/52* (2010.01)
*H01M 4/62* (2006.01)
*H01M 10/052* (2010.01)
*H01M 4/58* (2010.01)

(52) U.S. Cl.
CPC .............. *H01M 4/625* (2013.01); *Y02E 60/122* (2013.01); *H01M 10/052* (2013.01); *H01M 4/5825* (2013.01); *Y02T 10/7011* (2013.01)

USPC ........ 429/221; 429/209; 429/232; 429/218.1; 423/306

(58) Field of Classification Search
USPC ........................ 429/209–246; 29/623.1–623.5
See application file for complete search history.

(56) References Cited

U.S. PATENT DOCUMENTS

2010/0227221 A1    9/2010  Chang et al.
2011/0091772 A1*   4/2011  Mishima et al. .............. 429/221

FOREIGN PATENT DOCUMENTS

CN    10 133 3650       12/2008
JP    2001-110414 A     4/2001

(Continued)

OTHER PUBLICATIONS

Machine Translation of Lee et al. (KR 10-2007-0108664, Published Nov. 2007, pp. 1-11).*

(Continued)

*Primary Examiner* — Basia Ridley
*Assistant Examiner* — Caitline Wilmot
(74) *Attorney, Agent, or Firm* — Birch, Stewart, Kolasch & Birch, LLP

(57) ABSTRACT

Disclosed is lithium iron phosphate having an olivine crystal structure wherein carbon (C) is coated on particle surfaces of the lithium iron phosphate, wherein, when a powder of the lithium iron phosphate is dispersed in water, water is removed from the resulting dispersion and the resulting lithium iron phosphate residue is quantitatively analyzed, a ratio of the carbon-released lithium iron phosphate with respect to the total weight of the carbon-coated lithium iron phosphate is 0.005% by weight or less. Advantageously, the olivine-type lithium iron phosphate is not readily separated through uniform thin film coating on the surface of the lithium iron phosphate and exhibits superior conductivity and density, since carbon is coated on particle surfaces of lithium iron phosphate in a state in which the amount of carbon released in water is considerably small.

16 Claims, 1 Drawing Sheet

(56) References Cited

FOREIGN PATENT DOCUMENTS

| | | |
|---|---|---|
| JP | 2003-292308 | 10/2003 |
| JP | 2003-292309 | 10/2003 |
| KR | 10-2007-0091456 A | 9/2007 |
| KR | 10-2007-0108664 A | 11/2007 |
| KR | 10-2008-0083237 A | 9/2008 |
| KR | 10-2010-0036627 A | 4/2010 |
| WO | WO 2007/094644 * | 8/2007 ............. C01D 15/00 |
| WO | WO 2009/122686 * | 8/2009 .................... 429/221 |
| WO | 2009/122686 A1 | 10/2009 |

OTHER PUBLICATIONS

International Search Report, dated Feb. 6, 2012, issued in PCT/KR2011/002878, pp. 1-2.

* cited by examiner

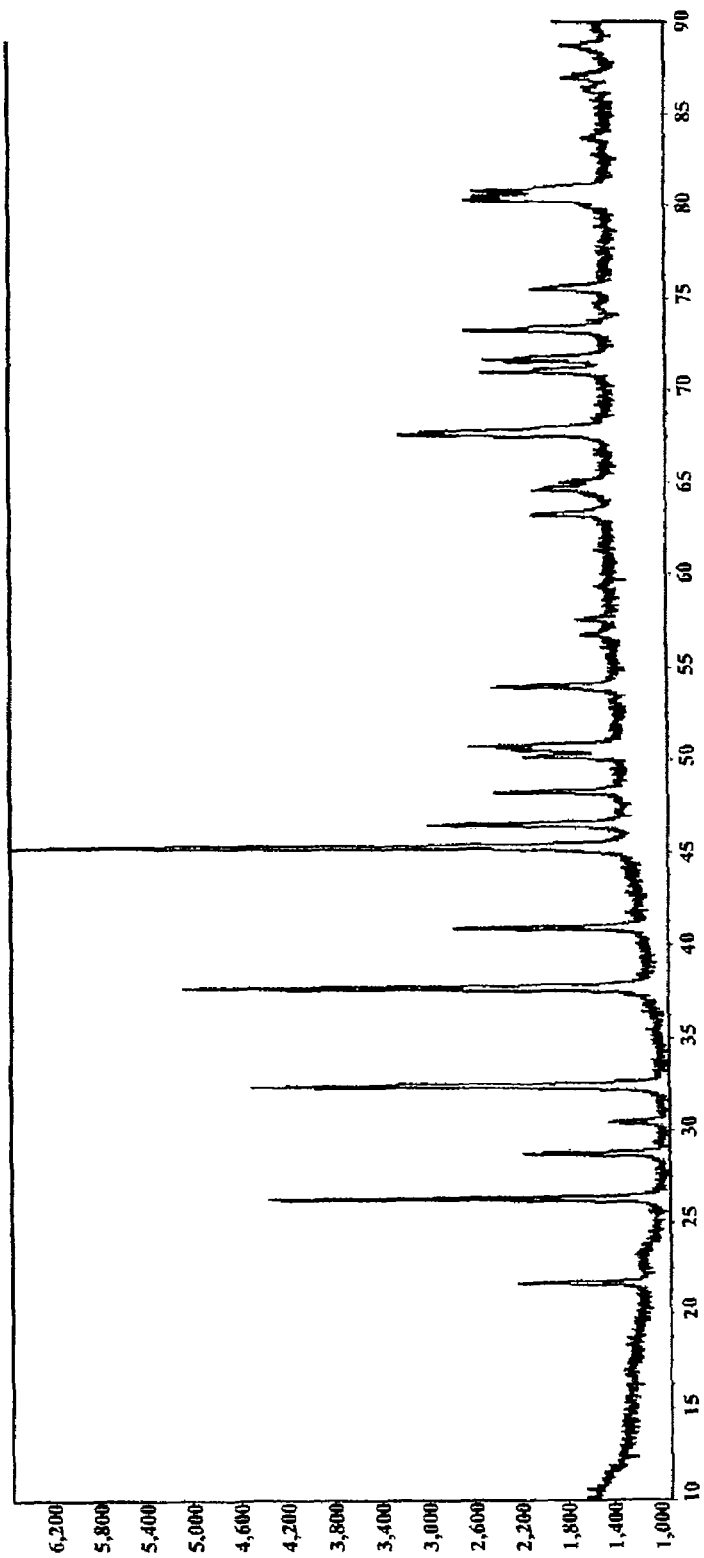

LITHIUM IRON PHOSPHATE OF OLIVINE CRYSTAL STRUCTURE AND LITHIUM SECONDARY BATTERY USING THE SAME

TECHNICAL FIELD

The present invention relates to lithium iron phosphate having an olivine crystal structure wherein carbon (C) is coated on particle surfaces of the lithium iron phosphate, wherein, when a powder of the lithium iron phosphate is dispersed in water, water is removed from the resulting dispersion and the resulting lithium iron phosphate residue is quantitatively analyzed, a ratio of the carbon-released lithium iron phosphate with respect to the total weight of the carbon-coated lithium iron phosphate is 0.005% by weight or less.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

The lithium secondary batteries generally use a carbon material as an anode active material. Also, the use of lithium metals, sulfur compounds, silicon compounds, tin compounds and the like as the anode active material have been considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

$LiCoO_2$ is currently used owing to superior physical properties such as cycle life, but has disadvantages of low stability and high-cost due to use of cobalt, which suffers from natural resource limitations, and limitations of mass-use as a power source for electric automobiles. $LiNiO_2$ is unsuitable for practical application to mass-production at a reasonable cost due to many features associated with preparation methods thereof Lithium manganese oxides such as $LiMnO_2$ and $LiMn_2O_4$ have a disadvantage of short cycle life.

Accordingly, methods of using lithium transition metal phosphate as a cathode active material have been researched. Lithium transition metal phosphate is largely divided into $Li_xM_2(PO_4)_3$ having a Nasicon structure and $LiMPO_4$ having an olivine structure, and is found to exhibit superior high-temperature stability, as compared to conventional $LiCoO_2$. To date, $Li_3V_2(PO_4)_3$ is the most widely known Nasicon structure compound, and LiFePO4 and Li(Mn, Fe)PO4 are the most widely studied olivine structure compounds.

Among olivine structure compounds, $LiFePO_4$ has a high output voltage of 3.5V and a high volume density of 3.6 g/cm$^3$, as compared to lithium (Li), and has a high theoretical capacity of 170 mAh/g, exhibits superior high-temperature stability, as compared to cobalt (Co), and utilizes cheap Fe as an component, thus being highly applicable as the cathode active material for lithium secondary batteries.

However, $LiFePO_4$ disadvantageously causes an increase in internal resistance of batteries due to low electrical conductivity, when used as a cathode active material. For this reason, when battery circuits are closed, polarization potential increases, thus decreasing battery capacity.

In order to solve these problems, Japanese Patent Application Publication No. 2001-110414 suggests incorporation of conductive materials into olivine-type metal phosphates in order to improve conductivity.

However, $LiFePO_4$ is commonly prepared by solid state methods, hydrothermal methods and the like using $Li_2CO_3$ or LiOH as a lithium source. Lithium sources and carbon sources added to improve conductivity disadvantageously generate a great amount of $Li_2CO_3$. Such $Li_2CO_3$ is degraded during charging, or reacts with an electrolyte solution to produce $CO_2$ gas, thus disadvantageously causing production of a great amount of gas during storage or cycles. As a result, disadvantageously, swelling of batteries is generated and high-temperature stability is deteriorated.

In this regard, a method for coating carbon on $LiFePO_4$ is known. However, through repeated experimentation, the inventors of the present invention found that a great amount of carbon should be used in order to obtain desired electrical conductivity using this method. The deterioration in overall physical properties is inevitable during design of batteries and further, a great amount of carbon used for coating is present in the form of aggregates between particles, thus disadvantageously making it difficult to realize uniform coating.

Accordingly, there is an increasing need for methods to solve these problems.

DISCLOSURE

Technical Problem

Therefore, the present invention has been made to solve the above problems and other technical problems that have yet to be resolved.

As a result of a variety of extensive and intensive studies and experiments, the inventors of the present invention have developed lithium iron phosphate that has an olivine crystal structure and is coated with carbon in a state in which the amount of carbon released in water is considerably small.

Technical Solution

In accordance with one aspect of the present invention, provided is lithium iron phosphate having an olivine crystal structure wherein carbon (C) is coated on particle surfaces of the lithium iron phosphate, wherein, when a powder of the lithium iron phosphate is dispersed in water, water is removed from the resulting dispersion and the resulting lithium iron phosphate residue is quantitatively analyzed, a ratio of the carbon-released lithium iron phosphate with respect to the total weight of the carbon-coated lithium iron phosphate is 0.005% by weight or less.

A small amount of carbon is released from the olivine-type lithium iron phosphate according to the present invention, when dispersed in water, since carbon (C) is coated on the particle surface of the lithium iron phosphate through uniform and strong bonding force. Accordingly, the lithium iron phosphate can exhibit high electrical conductivity in spite of coating of a small amount of carbon and prevent separation of electrodes in the manufacturing process thereof due to carbon coating with a strong bonding force, thus contributing to improvement in electrode density.

In a preferred embodiment, the lithium iron phosphate may be lithium iron phosphate having a composition represented by the following Formula (1).

$$Li_{1+a}Fe_{1-x}M_x(PO_{4-b})X_b \qquad (1)$$

wherein

M is at least one selected from Al, Mg, Ni, Co, Mn, Ti, Ga, Cu, V, Nb, Zr, Ce, In, Zn and Y, X is at least one selected from F, S and N, and
−0.5≤a≤+0.5, 0≤x≤0.5, 0≤b≤0.1.

Any type of compound may be used as an olivine-type lithium iron phosphate according to the present invention so long as it satisfies the conditions of the following formula 1 and a representative example thereof is LiFePO$_4$, but is not limited thereto. It is impossible to obtain only pure LiFePO$_4$ in the preparation process of LiFePO$_4$. Characteristics required for the present invention can be exerted when the conditions of the following formula 1 are satisfied.

The bonding state of carbon to lithium iron phosphate can be confirmed, as defined above, by a method including dispersing a powder of lithium iron phosphate in water for one hour, removing water from the resulting dispersion and measuring the weight of carbon-released lithium iron phosphate (lithium iron phosphate in which the carbon is released) through quantitative analysis of the resulting lithium iron phosphate residue. More details thereof will be obtained from the following Test Example 1.

As defined above, the content of carbon-released lithium iron phosphate is 0.005 wt % or less with respect to the total weight of the carbon (C)-coated lithium iron phosphate, which is a considerably small amount, when taking into consideration the fact that, in the case of conventional lithium iron phosphates, the ratio is 0.1 wt % or more when analyzed under the same conditions.

The content of the carbon-released lithium iron phosphate is preferably 0.004 wt % or less.

Meanwhile, carbon (C) is preferably coated in an amount of 0.01 to 10% by weight, based on the weight of the lithium iron phosphate. When the content of carbon is excessive, the amount of active material becomes relatively low, capacity disadvantageously decreases and electrode density is disadvantageously deteriorated. On the other hand, when the content of carbon is excessively small, disadvantageously, desired electrical conductivity cannot be obtained. The amount of coated carbon is more preferably 0.03 to 7% by weight.

In addition, carbon is preferably uniformly coated on the surface of lithium iron phosphate to a thickness of 2 to 50 nm. When carbon is excessively thickly coated on the surface of lithium iron phosphate, it may interfere with intercalation and deintercalation of lithium ions, and on the other hand, an excessively thin coating cannot secure uniform coating and cannot provide desired electrical conductivity. A more preferred coating thickness may be 3 to 10 nm.

In a preferred embodiment, the lithium iron phosphate may contain a predetermined amount of sulfur (S). The sulfur contained therein contributes to coating of carbon on the lithium iron phosphate through uniform and strong bonding force based on combined actions of sulfur with carbon to lithium iron phosphate.

In the present invention, the relationship between sulfur and carbon is not clear, but sulfur and carbon may be present in the form of a structure selected from (i) a structure in which carbon is coated on the surface of lithium iron phosphate particles in a state in which a predetermined amount of sulfur is contained on the surface of lithium iron phosphate particles and/or inside the same, (ii) a structure in which both sulfur and carbon are coated on the surface of lithium iron phosphate particles, (iii) a structure in which a composite of sulfur and carbon is coated on the surface of lithium iron phosphate particles, (iv) a structure in which carbon is bonded through sulfur to lithium iron phosphate particles, and combinations thereof.

The sulfur (S) is preferably contained in an amount of 0.05 to 5% by weight, based on the total weight of the lithium iron phosphate. Disadvantageously, when the content of sulfur (S) is excessively high, physical properties of lithium iron phosphate may be deteriorated and, on the other hand, when the content of sulfur (S) is excessively low, uniform coating and strong bonding force of carbon cannot be exerted. The content is more preferably 0.1 to 2% by weight.

For example, the sulfur (S) may be derived from precursors for preparation of lithium iron phosphate. When FePO$_4$ is used for preparation of lithium iron phosphate, sulfur may remain in the products after reaction. Generally, when sulfur remains in an active material, washing is performed several times in order to completely remove the sulfur.

On the other hand, according to the present invention, remaining sulfur (S) may be used in combination with carbon coating, for example, after a predetermined amount of sulfur is left in lithium iron phosphate by decreasing the repetition number of washing process or washing intensity, carbon coating is performed. For this reason, uniform and strong coating as well as reduction of preparation costs of active material caused by simplification of washing process can be advantageously realized. In particular, when primary particles of lithium iron phosphate are nanomaterials, the overall efficiency of the fabrication process of secondary batteries can be further improved by minimizing the washing process as described above.

In another embodiment, sulfur (S) may be incorporated by adding a sulfur-containing compound to lithium iron phosphate. The sulfur-containing compound is at least one selected from sulfides, sulfites and sulfates.

The present invention provides lithium iron phosphate having an olivine crystal structure wherein the lithium iron phosphate has a composition represented by the following Formula 2:

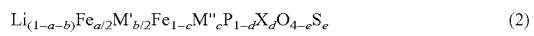

$$Li_{(1-a-b)}Fe_{a/2}M'_{b/2}Fe_{1-c}M''_cP_{1-d}X_dO_{4-e}S_e \quad (2)$$

wherein M' is at least one selected from the group consisting of Mg, Ni, Co, Mn, Ti, Cr, Cu, V, Ce, Sn, Ba, Ca, Sr and Zn;

M" is at least one selected from the group consisting of Al, Mg, Ni, Co, Mn, Ti, Cr, Cu, V, Ce, Sn, Ba, Ca, Sr and Zn;

X is at least one selected from the group consisting of As, Sb, Bi, Mo, V, Nb and Te; and 0≤a≤0.6, 0≤b≤0.6, 0≤c≤1, 0≤e≤3.5.

Considering the composition of Formula 2, Fe and/or M' is doped into lithium sites and M" is doped into Fe sites, X is doped into P sites X, and a part of sulfur (S) is substituted into oxygen sites.

In the formula above, a and b are each 0.6 or less, but when a+b is 1 or higher, since lithium is not used, a+b should be lower than 1 during charge and discharge. a+b is preferably 0.5, in view of the amount of lithium that is intercalated and deintercalated during charge and discharge and thus exhibits electrochemical properties.

The present invention provides a method for preparing the olivine-type lithium iron phosphate.

In a preferred embodiment, the olivine-type lithium iron phosphate may be prepared by a method comprising:
(a) primarily mixing precursors as starting materials;
(b) secondarily mixing the mixture of step (a) with supercritical or subcritical water to synthesize lithium iron phosphate;
(c) mixing the synthesized lithium iron phosphate with a carbon precursor and drying the mixture; and
(d) heating the mixture of the lithium iron phosphate and the carbon precursor.

In step (a), as a lithium precursor, one of the components, Li$_2$CO$_3$, Li(OH), Li(OH).H$_2$O, LiNO$_3$ or the like may be used. As an iron (Fe) precursor, a compound containing at least a sulfur ingredient so that sulfur is left on the surface of the produced lithium iron phosphate such as $FeSO_4$, $FeC_2O_4 \cdot 2H_2O$ or $FeCl_2$ may be used. $FeSO_4$ is particularly preferred since it contains a sulfur element. As a phosphorus (P) precursor, $H_3PO_4$, $NH_4H_2PO_4$, $(NH_4)_2HPO_4$ or $P_2O_5$ may be used.

If necessary, an alkalinizing agent may be further added to the components. In this case, the alcalinizing agent may be an alkali metal hydroxide, an alkaline earth metal hydroxide, an ammonia compound or the like.

In step (b), the supercritical or subcritical water may be water at a pressure of 180 to 550 bar at 200 to 700° C. and the heating temperature in step (d) may be 600 to 1200° C.

Any carbon precursor may be used so long as it can produce carbon during a baking process under a reduction atmosphere. Preferably, the carbon precursor may be a polyol-type carbon-containing precursor and non-limiting examples thereof include sucrose, cellulose, glucose and the like.

In another embodiment, the olivine-type lithium iron phosphate may be prepared by the following method comprising:
 (a') primarily mixing precursors as starting materials;
 (b') secondarily mixing the mixture of step (a') with supercritical or subcritical water to synthesize lithium iron phosphate, followed by drying;
 (c') heating the synthesized lithium iron phosphate; and
 (d') milling the lithium iron phosphate and a carbon powder.

In step (d'), the milling method is well-known in the art and a detailed explanation thereof is thus omitted. In a preferred embodiment, the milling method may be ball milling.

In step (d) or (c'), the heating may be carried out under an inert gas atmosphere. Any inert gas may be used without particular limitation so long as it has low reactivity. Preferred examples thereof include Ar, $N_2$ and the like.

The synthesis of lithium iron phosphate of the present invention is preferably performed through a continuous reaction process.

The lithium iron phosphate according to the present invention may be in the form of a primary particle or a secondary particle. The lithium iron phosphate in the form of a secondary particle may be prepared by drying a mixture of primary particles having a predetermined particle diameter, a binder and a solvent, followed by aggregating.

In the mixture, preferably, the primary particle is present in an amount of 5 to 20 wt % with respect to the weight of the solvent and the binder is present in an amount of 5 to 20 wt % with respect to the weight of the solvent. By controlling a ratio of the primary particle and the solvent, an internal porosity of the secondary particle can be controlled. Examples of the solvent that can be used during the process include all organic solvents such as polar solvents such as water and non-polar solvents. In addition, examples of the binder used in the step include, but are not limited to, sucrose and lactose-based sugars, PVDF or PE-based polymers and cokes which are soluble in a polar solvent.

The dying and preparation of the secondary particles may be carried out at the same time by various methods known in the art, including spray drying, fluidized-bed drying, vibration drying, etc. In particular, rotating spray drying is preferred, because it enables preparation of secondary particles in the form of spheres and thus improves tap density.

The drying may be carried out at 120 to 200° C. under inert gas (e.g., Ar, $N_2$) atmosphere.

Also, the olivine-type lithium iron phosphate according to the present invention is preferably prepared by a coprecipitation or solid phase method.

For example, the olivine-type lithium iron phosphate containing sulfur (S) may be prepared by a method comprising:
 (a") synthesizing lithium iron phosphate using precursors as starting materials by a coprecipitation or solid phase method;
 (b") adding the synthesized lithium iron phosphate to a dispersion chamber containing a sulfur-containing compound, followed by stirring;
 (c") drying the mixture obtained in step (b"), followed by baking; and
 (d") mixing the lithium iron phosphate obtained in step (c") with a carbon powder, followed by milling, or mixing the calcinized lithium iron phosphate and a carbon precursor with a solvent, followed by drying and baking.

The coprecipitation or solid phase method in step (a") is well-known in the art and a detailed explanation thereof is thus omitted.

The sulfur-containing compound used for step (b") may be a sulfide, sulfite, sulfate or the like, as mentioned above, and may be used within a range in which a content suggested in the present invention of sulfur can be contained.

The present invention provides a cathode mix comprising lithium iron phosphate as a cathode active material. The cathode mix may optionally contain, in addition to the cathode active material, a conductive material, a binder, a filler and the like.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the cathode active material may be composed of only the olivine-type lithium iron phosphate and a combination of olivine-type lithium iron phosphate and lithium-containing transition metal oxide, if necessary.

Examples of the lithium transition metal composite oxide include, but are not limited to, layered compounds such as lithium cobalt oxide ($LiCoO_2$) and lithium nickel oxide ($LiNiO_2$), or compounds substituted with one or more transition metals; lithium manganese oxides such as compounds of formula $Li_{1+y}Mn_{2-y}O_4$ ($0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-y}M_yO_2$ (M=Co, Mn, Al, Cu, Fe, Mg, B or Ga, and $0.01 \leq y \leq 0.3$); lithium manganese composite oxides of Formula $LiMn_{2-y}M_yO_2$ (M=Co, Ni, Fe, Cr, Zn or Ta, and $0.01 \leq y \leq 0.1$), or formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The present invention provides a cathode wherein the cathode mix is applied to a collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 µm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned components, i.e., the conductive material, the binder and the filler, if necessary.

The anode current collector is generally fabricated to have a thickness of 3 to 500 µm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte solution, solid electrolyte and inorganic solid electrolyte may be utilized.

Examples of the non-aqueous electrolyte solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trim ethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention, include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sultone (PRS), fluoro-ethylene carbonate (FEC) and the like.

The lithium secondary batteries according to the present invention may be used as unit batteries of battery modules, which are power sources of medium and large devices requiring high-temperature stability, long cycle properties and high rate properties.

Preferably, examples of medium and large devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts and the like.

BRIEF DESCRIPTION OF THE DRAWINGS

The above and other objects, features and other advantages of the present invention will be more clearly understood from the following detailed description taken in conjunction with the accompanying drawings, in which:

FIG. 1 shows XRD analysis data of a grayish red-brown residue obtained after lithium iron phosphate of Comparative Example 1 is stirred in a solvent in Test Example 2.

BEST MODE

Now, the present invention will be described in more detail with reference to the following examples. These examples are provided only to illustrate the present invention and should not be construed as limiting the scope and spirit of the present invention.

Example 1

21.5 g of LiOH—$H_2O$, 22 g of aqueous ammonia (~29 wt %), and 956.5 g of distilled water were mixed with one another and dissolved to prepare an aqueous solution A. In the same manner as above, 70.65 g of $FeSO_4$-$7H_2O$, 7.065 g of sucrose, 28.85 g of phosphoric acid (85 wt %), and 893.435 g of distilled water were mixed with one another and dissolved to prepare an aqueous solution B.

Supercritical water (450° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A contacted the aqueous solution B to produce a slurry and was then reacted with the supercritical water. The aqueous solution A was reacted with supercritical water within one second after production of slurry.

The resulting product was cooled and filtered at the end of the tubular reactor to obtain a slurry containing an intermediate. A controlled concentration of water was added to the slurry to obtain a slurry having a solid content of 20 wt %, and 10 wt % of sucrose based on the solid was added thereto, followed by dissolution. The slurry thus obtained was spray-dried to obtain a sucrose-coated $LiFePO_4$ powder. The powder thus obtained was heated under a nitrogen atmosphere at about 700° C. for 10 hours to obtain a final carbon-coated $LiFePO_4$ powder. As a result of XRD-Rietveld analysis, it could be seen that the powder was a $LiFePO_4$ crystal. The $LiFePO_4$ powder thus obtained was subjected to C&S analysis to measure contents of carbon and sulfur. As a result, the content of carbon was found to be 2.5 wt % and the content of sulfur was found to be 0.74 wt %.

Example 2

21.5 g of LiOH—$H_2O$, 27 g of aqueous ammonia (~29 wt %), and 950.5 g of distilled water were mixed with one another and dissolved to prepare an aqueous solution A. In the same manner as above, 72.65 g of $FeSO_4$-$7H_2O$, 6.065 g of sucrose, 28.85 g of phosphoric acid (85 wt %), and 890.435 g of distilled water were mixed with one another and dissolved to prepare an aqueous solution B.

Supercritical water (430° C., 240 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction.

The resulting product was cooled and filtered at the end of the tubular reactor to obtain a slurry containing an intermediate. A controlled concentration of water was added to the slurry to obtain a slurry having a solid content of 20 wt %, and 7 wt % of sucrose based on the solid was added thereto, followed by dissolution. The slurry thus obtained was spray-dried to obtain a sucrose-coated $LiFePO_4$ powder. The powder thus obtained was heated under a nitrogen atmosphere at about 700° C. for 10 hours to obtain a final carbon-coated $LiFePO_4$ powder. As a result of XRD-Rietveld analysis, it could be seen that the powder was a $LiFePO_4$ crystal. The $LiFePO_4$ powder thus obtained was subjected to C&S analysis to measure contents of carbon and sulfur. As a result, the content of carbon was found to be 1.8 wt % and the content of sulfur was found to be 0.82 wt %.

Example 3

40.9 g of LiOH—$H_2O$, 32.4 g of aqueous ammonia (~29 wt %), and 934.7 g of distilled water were mixed with one another and dissolved to prepare an aqueous solution A. In the same manner as above, 140.3 g of $FeSO_4$-$7H_2O$, 13.13 g of sucrose, 57.7 g of phosphoric acid (85 wt %), 3.1 g of sulfur and 767 g of distilled water were mixed with one another and dissolved to prepare an aqueous solution B. Supercritical water (450° C., 250 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry to prepare $LiFePO_{3.8}S_{0.2}$.

The $LiFePO_{3.8}S_{0.2}$ reaction solution thus obtained was cooled and filtered at the end of the tubular reactor to obtain a $LiFePO_{3.8}S_{0.2}$ slurry. A controlled concentration of water was added to the slurry to obtain a slurry having a solid content of 10 wt %, and 10 wt % of sucrose based on the solid was added thereto, followed by dissolution. The slurry thus obtained was spray-dried to obtain a sucrose-coated $LiFePO_{3.8}S_{0.2}$ powder.

The powder thus obtained was heated under a nitrogen atmosphere at about 700° C. for 10 hours to obtain a final carbon-coated $LiFePO_{3.8}S_{0.2}$ powder.

The $LiFePO_{3.8}S_{0.2}$ powder thus obtained was subjected to C&S analysis to measure contents of carbon and sulfur. As a result, the content of carbon was found to be 1.8 wt % and the content of sulfur was found to be 0.9 wt %.

Example 4

34.8 g of LiOH—$H_2O$, 37.1 g of aqueous ammonia (~29 wt %), and 904.7 g of distilled water were mixed with one another and dissolved to prepare an aqueous solution A. In the same manner as above, 104.2 g of $FeSO_4$-$7H_2O$, 14.13 g of sucrose, 57.7 g of phosphoric acid (85 wt %), 15.3 g of $NiSO_4$-$7H_2O$ and 795.7 g of distilled water were mixed with one another and dissolved to prepare an aqueous solution B. Supercritical water (455° C., 240 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry to prepare $Li_{0.7}Ni_{0.15}Fe_{0.78}Ni_{0.22}PO_4$.

The $Li_{0.7}Ni_{0.15}Fe_{0.78}Ni_{0.22}PO_4$ reaction solution thus obtained was cooled and filtered at the end of the tubular reactor to obtain $Li_{0.7}Ni_{0.15}Fe_{0.78}Ni_{0.22}PO_4$ slurry. A controlled concentration of water was added to the slurry to obtain a slurry having a solid content of 10 wt %, and 12 wt % of sucrose based on the solid was added thereto, followed by dissolution. The slurry thus obtained was spray-dried to obtain a sucrose-coated $Li_{0.7}Ni_{0.15}Fe_{0.78}Ni_{0.22}PO_4$ powder.

The powder thus obtained was heated under a nitrogen atmosphere at about 650° C. for 10 hours to obtain a final carbon-coated $Li_{0.7}Ni_{0.15}Fe_{0.78}Ni_{0.22}PO_4$ powder.

The $Li_{0.7}Ni_{0.15}Fe_{0.78}Ni_{0.22}PO_4$ powder thus obtained was subjected to C&S analysis to measure contents of carbon and sulfur. As a result, the content of carbon was found to be 2.7 wt % and the content of sulfur was found to be 0.7 wt %.

Example 5

34.1 g of LiOH—$H_2O$, 30.4 g of aqueous ammonia (~29 wt %), and 914.7 g of distilled water were mixed with one another and dissolved to prepare an aqueous solution A. In the same manner as above, 103.3 g of $FeSO_4$-$7H_2O$, 17.13 g of sucrose, 58.7 g of phosphoric acid (85 wt %), 9.2 g of $NiSO_4$-$7H_2O$, 11 g of $CaCl_2$-$6H_2O$ and 756.2 g of distilled water were mixed with one another and dissolved to prepare an aqueous solution B. Supercritical water (410° C., 230 bar) was flowed at an elevated temperature and at an elevated pressure at 100 g/min into a continuous tubular reactor, and the aqueous solution A and the aqueous solution B were flowed at a flow rate of 15 g/min and brought in contact with the supercritical water for several seconds and mixed to induce reaction. At this time, the aqueous solution A first contacted the aqueous solution B to produce a slurry and was then reacted with the supercritical water. The aqueous solution A was reacted with supercritical water as soon as possible after production of slurry to prepare $Li_{0.7}Ca_{0.15}Fe_{0.79}Ni_{0.15}Ca_{0.06}PO_4$.

The $Li_{0.3}Ca_{0.15}Fe_{0.79}Ni_{0.15}Ca_{0.06}PO_4$ reaction solution thus obtained was cooled and filtered at the end of the tubular reactor to obtain a $Li_{0.3}Ca_{0.15}Fe_{0.79}Ni_{0.15}Ca_{0.06}PO_4$ slurry. A controlled concentration of water was added to the slurry to obtain a slurry having a solid content of 15 wt %, and 6 wt % of sucrose based on the solid was added thereto, followed by dissolution. The slurry thus obtained was spray-dried to obtain a sucrose-coated $Li_{0.7}Ca_{0.15}Fe_{0.79}Ni_{0.15}Ca_{0.06}PO_4$ powder.

The powder thus obtained was heated under a nitrogen atmosphere at about 720° C. for 7 hours to obtain a final carbon-coated $Li_{0.3}Ca_{0.15}Fe_{0.79}Ni_{0.15}Ca_{0.06}PO_4$ powder.

The $Li_{0.3}Ca_{0.15}Fe_{0.79}Ni_{0.15}Ca_{0.06}PO_4$ powder thus obtained was subjected to C&S analysis to measure contents of carbon and sulfur. As a result, the content of carbon was found to be 1.3 wt % and the content of sulfur was found to be 0.5 wt %.

Comparative Example 1

LiOH—$H_2O$, $Fe(C_2O_4)$-$2H_2O$, and $H_3PO_4$ were placed as raw materials at a molar ratio of 3:1:1 in an autoclave batch reactor, and the materials were reacted with one another at an elevated internal temperature of the reactor of about 200° C. for 6 hours to synthesize $LiFePO_4$. Sucrose was added to the slurry containing $LiFePO_4$ thus obtained, in the same manner as Example 1, followed by spray-drying and baking under a nitrogen atmosphere to obtain a $LiFePO_4$ powder as a final product. The $LiFePO_4$ powder thus obtained was subjected to C&S analysis to measure contents of carbon and sulfur. As a result, the content of carbon was found to be 2 wt % and the content of sulfur was found to be 0.01 wt %.

Test Example 1

100 g of each of the lithium iron phosphate powders prepared in Examples 1 to 5 and Comparative Example 1 was added to 500 g of water, followed by stirring for one hour and dispersing. Then, the dispersion state was confirmed. As a result, the dispersions of lithium iron phosphate powders according to Examples 1 to 5 were transparent in color, while the dispersion of the lithium iron phosphate powder according to Comparative Example 1 was gray in color.

The dispersion was separated, water was removed therefrom by centrifugation, dried at 80° C. for 12 hours to obtain grayish red-brown residues. It was confirmed through XRD analysis that the residues were powders having a pure olivine crystal structure. The XRD analysis data is shown in FIG. 1.

In addition, presence of black particles on the surface of the dispersion was observed. It was confirmed through analysis that the particles were carbon particles. As apparent from the fore-going, when lithium iron phosphate powders prepared in Examples 1 to 5 and Comparative Example 1 were dispersed in water, carbon was separated (released) from the carbon-coated lithium iron phosphate.

After the lithium iron phosphate powder of Comparative Example 1 was subjected to dispersion testing for one hour, the grayish red-brown residue was weighed. As a result, the weight was 0.12 g, which means that a ratio of the weight of the carbon-released lithium iron phosphate particles with respect to the total weight of the carbon-coated lithium iron phosphate particles is 0.12 wt %. The lithium iron phosphate powders of Examples 1 to 5 were subjected to dispersion testing and the resulting residues were weighed. As a result, the weights were 0.003 g, 0.001 g, 0.002 g, 0.003 g and 0.002 g, which means that respective ratios of the weight of the carbon-released lithium iron phosphate particles with respect to the total weight of the carbon-coated lithium iron phosphate were 0.003 wt %, 0.001 wt %, 0.002 wt %, 0.003 wt % and 0.002 wt %.

As apparent from the fore-going, the powder of Comparative Example 1 exhibited considerably superior carbon-release property in water, as compared to the powders of Examples 1 to 5.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, advantageously, the olivine-type lithium iron phosphate according to the present invention is not readily separated through uniform thin film coating on the surface of the lithium iron phosphate and exhibits superior conductivity and density, since carbon is coated on particle surfaces of lithium iron phosphate in a state in which the amount of carbon released in water is considerably small.

The invention claimed is:

1. Lithium iron phosphate having an olivine crystal structure wherein carbon (C) is coated on particle surfaces of the lithium iron phosphate, wherein, when a powder of the lithium iron phosphate is dispersed in water, water is removed from the resulting dispersion and the resulting lithium iron phosphate residue is quantitatively analyzed, a ratio of the carbon-released lithium iron phosphate with respect to the total weight of the carbon-coated lithium iron phosphate is 0.005% by weight or less, wherein the lithium iron phosphate contains 0.1 to 2% by weight of sulfur (S), based on the total weight of the lithium iron phosphate.

2. The lithium iron phosphate according to claim 1, wherein the lithium iron phosphate has a composition represented by the following Formula 1:

$$Li_{1+a}Fe_{1-x}M_x(PO_{4-b})X_b \quad (1)$$

wherein

M is at least one selected from Al, Mg, Ni, Co, Mn, Ti, Ga, Cu, V, Nb, Zr, Ce, In, Zn and Y, X is at least one selected from F, S and N, and $-0.5 \leq a \leq +0.5$, $0 \leq x \leq 0.5$, $0 \leq b \leq 0.1$.

3. The lithium iron phosphate according to claim 2, wherein the lithium iron phosphate is $LiFePO_4$.

4. The lithium iron phosphate according to claim 1, wherein a ratio of the carbon-released lithium iron phosphate with respect to the total weight of the carbon-coated lithium iron phosphate is 0.004% by weight or less.

5. The lithium iron phosphate according to claim 1, wherein the carbon (C) is coated at an amount of 0.01 to 10% by weight, based on the total weight of the lithium iron phosphate.

6. The lithium iron phosphate according to claim 1, wherein the carbon is coated on the surface of lithium iron phosphate to a thickness of 2 to 50 nm.

7. The lithium iron phosphate according to claim 1, wherein the sulfur and the carbon are present in the form of a structure selected from the group consisting of (i) a structure in which carbon is coated on the surface of lithium iron phosphate particles in a state in which a predetermined amount of sulfur is contained on the surface of lithium iron phosphate particles and/or inside the same, (ii) a structure in which both sulfur and carbon are coated on the surface of lithium iron phosphate particles, (iii) a structure in which a composite of sulfur and carbon is coated on the surface of lithium iron phosphate particles, (iv) a structure in which carbon is bonded through sulfur to lithium iron phosphate particles, and combinations thereof.

8. The lithium iron phosphate according to claim 1, wherein the lithium iron phosphate has a composition represented by the following Formula 2:

$$Li_{(1-a-b)}Fe_{a/2}M'_{b/2}Fe_{1-c}M''_cP_1O_{4-e}S_e \quad (2)$$

wherein M' is at least one selected from the group consisting of Mg, Ni, Co, Mn, Ti, Cr, Cu, V, Ce, Sn, Ba, Ca, Sr and Zn;

M" is at least one selected from the group consisting of Al, Mg, Ni, Co, Mn, Ti, Cr, Cu, V, Ce, Sn, Ba, Ca, Sr and Zn; and $0 \leq a \leq 0.6$, $0 \leq b \leq 0.6$, $0 \leq c \leq 1$, $0 \leq e \leq 3.5$.

9. A method for preparing the lithium iron phosphate according to claim comprising:

(a) primarily mixing precursors as starting materials:

(b) secondarily mixing the mixture obtained in step (a) with supercritical or subcritical water to synthesize lithium iron phosphate;

(c) mixing the synthesized lithium iron phosphate with a carbon precursor and drying the mixture; and (d) heating the mixture of the lithium iron phosphate and the carbon precursor.

10. A method for preparing the lithium iron phosphate according to claim 1 Comprising:

(a') primarily mixing precursors as starting materials;

(b') secondarily mixing the mixture obtained in step (a') with supercritical or subcritical water to synthesize lithium iron phosphate, followed by drying;

(c') heating the synthesized lithium iron phosphate; and (d') milling the lithium iron phosphate and a carbon powder.

11. The method according to claim 9, wherein the heating is carried out under an inert gas atmosphere.

12. The method according to claim 9, wherein the synthesis of the lithium iron phosphate is carried out by a continuous reaction process.

13. A cathode mix comprising the lithium iron phosphate according to claim. 1 as a cathode active material.

14. A lithium secondary battery comprisimg a cathode in which the cathode mix according to claim 13 is applied to a current collector.

15. The lithium secondary battery according to claim 14, wherein the lithium secondary battery is a unit battery of a battery module that is a power source of a medium to large device.

16. The lithium secondary battery according to claim 15, wherein the medium to large device is a power tool, an electric vehicle, a hybrid electric vehicle, or an electric golf cart.

* * * * *